Patented Nov. 24, 1925.

1,562,890

UNITED STATES PATENT OFFICE.

CHARLES J. KINZIE, OF NIAGARA FALLS, NEW YORK, ASSIGNOR TO THE TITANIUM ALLOY MANUFACTURING COMPANY, OF NEW YORK, N. Y., A CORPORATION OF MAINE.

ZIRCONIUM-OXIDE COMPLEX AND METHOD OF PRODUCING AND USING THE SAME.

No Drawing.   Application filed April 10, 1923.   Serial No. 631,215.

*To all whom it may concern:*

Be it known that I, CHARLES J. KINZIE, a citizen of the United States, and a resident of Niagara Falls, in the county of Niagara and State of New York, have invented a novel Zirconium-Oxide Complex and Method of Producing and Using the Same, of which the following is a specification.

My present invention relates to the use of zirconium oxide, or that is to say zirconia, as an opacifier in finally vitrified glass products, including particularly enamels, and its objects comprise provision of a more economically and readily workable process whereby from crude materials, or partially purified preparations, consisting principally of zirconia, remaining impurities discolorative of the final enamel may be eliminated or rendered comparatively impotent to prevent desired whiteness.

The increasing importance of zirconia as an opacifier in lieu of tin oxide, antimony oxide, etc., in enamelling, has recently stimulated invention of various processes for more perfectly concentrating or separating it from such, for some purposes, undesirable, impurities, for example silicon, iron, titanium, etc., or their compounds, more or less of which respectively are usually found associated therewith as in the natural ores.

Such a process is that of Letters Patent No. 1,351,091, granted to Louis E. Barton August 31st, 1920, whereby is produced, as from ore, a product consisting essentially of zirconium cyanonitride or carbide and which, on calcination, yields a comparatively pure, but crude zirconia which however generally useful as an opacifier, or for other purposes, nevertheless usually retains so much still of the referred to impurities and of particles of carbon or its compounds as to be prohibitive of such whiteness as may be desired in certain enamel wares because impartive of undesirable, for example distinctly gray, colorations.

In practicing the so-called "wet" processes of enamelling, as on sheet metal, cast iron, etc., in which the opacifier is added at the mill along with the previously prepared frit material, clay, water, etc., such, for some purposes insufficiently purified preparations are not infrequently found unsuitable because their said impurities can be only partially or inadequately decomposed during the necessarily comparatively brief exposure thereof, and in a preponderance of the frit, to such temperatures as are permissible in enamelling, the result being that the surface of the enamelled wares, owing to persistence of said particles in substantially their original state, is too often so dull, gray, or rough, as not to satisfy certain commercial conventional requirements. It follows, therefore, that such previous zirconia preparations are, unless further refined at too often prohibitive cost, unavailable in the manufacture on commercial scales of white enamel ware by wet processes.

I have discovered that if to such a relatively insufficiently purified or crude zirconia preparation there be added, in advance of the enamelling operations proper, a less quantity of a mixture comprising materials such, and in such proportions, as if independently co-melted would yield a product designatable as a vitrification, i. e., a solidified glass or enamel (such a mixture being herein, as in the art, designated as a frit), and the thus composited charge be sufficiently highly and protractedly heated, fluxing, or other reactions attributable to presence of said added frit will occur, such as to, effectively for my purpose, so decompose the obectionable darkening particles, or so induce transformation or transference of more or less of their constituents into innocuous forms or novel complexes, or elimination as by volatilization of others, that my resulting thus, as it were, sintered or fritted zirconia complex will prove comparatively devoid of enamel-darkening or otherwise injurious constituents such as to prohibit its thereafter employment as an opacifier in white enamels. Furthermore, my thus intermediately prepared complex of the relatively crude or insufficiently purified zirconia with ingredients of an independently thereof glass-yielding frit seems to beneficially facilitate assimilation, and homogeneity of distribution, of its zirconia during the subsequent actual enamelling operations and also in the resulting enamel product thereby enhancing and improving the opaqueing effects.

As above stated, my preliminary and protracted heating or sintering or fritting at high temperatures of my employed mixture of comparatively crude zirconia-containing material, with a less quantity of the unvitrified or fluid materials of a glass-yielding frit involves subjection of the charge and particularly of the therein impurities to vigorous fluxing reactions, the decomposing effects of which seem attributable to conjoint action by the silicious or other acid-forming elements with alkali substances, such as sodium, potassium, etc., or with suitable bases, such as barium, calcium, etc., both classes of which (preferably more of the acid) are contributed to my charge by the addition thereto of such mixture of unvitrified molten glass or frit constituents as may be indicated and employed in each case.

The following is an example of how my invention is workable and its complex opacifier product obtained.

The crude or insufficiently refined zirconia material, or preparation, is milled, preferably to such fineness that all will pass through a 300 mesh sieve. To this is then added a less quantity of any preferred, or indicated, composition or mixture of ingredients qualified when by itself co-melted and cooled to yield a vitrified glass, including enamel, product.

This addition is thoroughly mixed with the zirconia-containing material and may be made thereto in the form of a previously unmelted mixture of the glass-yielding ingredients well comminuted, or, preferably, if so indicated, preliminarily melted to fluid glass, tapped, cooled, milled fine and so used.

The following is an example of ingredients and proportions suitable to constitute the added mixture thereof in either its unmelted and comminuted form or in its preliminarily melted and then comminuted form as hereinbefore explained.

| | Parts. |
|---|---|
| Feldspar | 100. |
| Quartz | 49.20 |
| Borax | 39.80 |
| Saltpeter | 16.70 |
| Limestone | 16.70 |
| Fluorspar | 3.36 |
| Magnesite | 2.59 |
| Cryolite | 30.30 |

Satisfactory results are attainable from proportioning the charge so as to contain about 100 parts of the milled zirconia-containing material to say about 10, or as I usually prefer 12, parts of the thereto added frit.

The charge is then heated to a relatively high temperature preferably about 1050° C. for a relatively protracted period, say from one to preferably about three hours, or until the impurities appear sufficiently decomposed; it is then cooled, milled to fine powder, and in this form becomes, as aforesaid, suitable as an opacifier, and particularly so in white ware enamels.

My thus produced and super-purified zirconia complexes are characterizable as being practically insoluble in water, as little as 0.66% thereof having dissolved during protracted exposure thereto; also as difficulty soluble in hydrochloric acid, not to exceed 6.88% thereof having been found to dissolve upon treatment with 15% hydrochloric acid at boiling temperature.

The composition of the opacifier product obtained by the practice of my invention as per the above example thereof was approximately as follows:

| | Per cent. |
|---|---|
| Zirconium oxide ($ZrO_2$) | 83.53 |
| Silica ($SiO_2$) | 11.81 |
| Soda ($Na_2O$) | 0.97 |
| Calcium oxide (CaO) | 0.54 |
| Boron oxide ($B_2O_3$) | 0.51 |
| Alumina ($Al_2O_3$) | 1.04 |
| Magnesia (MgO) | 0.07 |
| Potassium ($K_2O$) | 0.37 |
| Fluorine (F) | 1.16 |

It will be understood that successful practice of my invention is not restricted to the use therein of exactly the above tabulated mixture of glass-yielding ingredients, nor to resulting zirconia-containing opacifiers of exactly the above stated composition. Others also can be used, as I have indicated, with equal or greater success, according to varying conditions, one of their common, and as I believe novel, and indispensable characteristics being that in my said opacifier products the zirconia content is so altogether predominant and their, if otherwise treated, glass-yielding contents so much less as to completely distinguish them as regards composition, form, function and applicability from any hitherto known products containing zirconia in association with glass-yielding constituents, my said products being of a fritted or sintered rather than vitrified consistency.

For further examples, I have, in the practice of my invention, successfully used glass-yielding frits of the so-called high lead type for cast iron enamelling, also such frits of the high boron type. Besides these I have used several others, such as those commonly known as "soda lime glass," "potash lead crown glass," etc., but I prefer to use a composition such as I have above tabulated because of its lower sintering or fritting point and also on account of its freedom from such substances as barium, lead or antimony compounds, considered as objectionable in enamels for use in the culinary arts.

It will also be understood that my invention can be more or less successfully practiced by aid of heat treatments other than those above specified, the latter being given merely as examples of approximately those usually preferred, but which may be more or less varied as may be indicated, in any particular instance, to those skilled in the art, so long as the zirconia is so predominant and the temperatures are so high and so protracted as to ensure the required decomposition of the impurities and which, as above intimated, could not be expected from such heat or other treatments as approved in enamelling, and particularly in the white enamelling of cast or sheet iron articles.

To the vigorous fluxing actions above referred to may, I believe, be attributed my resulting improvements in color, due, it would seem, from breaking up of undesired more or less discolorative impurities present, such for instance as silicon, its carbide, ferro-silicon, carbon, its compounds, etc., and their transformations into less discolorative forms, such, for example, as silicon into silica or other compounds, and also the elimination of carbon as by volatilization, while my overcoming of the cream or yellow tones attributed to iron or its compounds may be due to their recombinations with other and whiter elements as for example contained in certain clays whose content of iron may be as high as 1% and yet the clay, when calcined, remains quite light in color. It seems probable that some such combinations may be effected by my said heating of my mixture of crude zirconia materials with a less quantity of the independently thereof glass-yielding materials.

Having now described my invention, what I claim as new and desire to secure by Letters Patent is the following, viz:

1. The method of treating material composed preponderatingly of zirconia, but containing also undesired impurities which comprises mixing said material with a relatively small quantity of independently thereof co-vitrifiable ingredients, and heating the resulting charge until said impurities shall have been decomposed and eliminated therefrom.

2. The method of treating material composed preponderatingly of zirconia, but containing also undesired impurities which comprises mixing said material with a relatively small quantity of independently thereof co-vitrifiable ingredients, heating the resulting mixture until said impurities shall have been decomposed and eliminated therefrom, cooling the resulting frit, comminuting it, adding it as an opacifier to an enamel-yielding frit, heating the resulting charge, and cooling it.

3. The method of treating material composed preponderatingly of zirconia, but containing also undesired impurities which comprises mixing said material with a relatively small quantity of an unvitrified, independently thereof, glass-yielding frit, and heating the resulting charge until said impurities shall have been decomposed and eliminated therefrom.

4. The method of treating material composed preponderatingly of zirconia, but containing also undesired impurities which comprises mixing said material with a relatively small quantity of an unvitrified, independently thereof glass-yielding frit, and heating the resulting charge to above 1000° C. until said impurities shall have been eliminated therefrom.

5. The method of treating material composed preponderatingly of zirconia, but containing also undesired impurities which comprises mixing said material with a relatively small quantity of an independently thereof glass-yielding frit, and heating the charge during more than one hour until said impurities shall have been eliminated therefrom.

6. The method of treating material composed preponderatingly of zirconia, but containing also undesired impurities which comprises mixing said material with a relatively small quantity of an unvitrified, independently thereof glass-yielding frit, and heating the charge to above 1000° C. during more than one hour until said impurities shall have been eliminated therefrom.

7. The method of treating material composed preponderatingly of zirconia, but containing also undesired impurities which comprises mixing said material with comminuted glass-yielding ingredients and heating the resulting charge until said impurities shall have been decomposed and eliminated therefrom.

8. The method of treating material composed preponderatingly of zirconia, but containing also undesired impurities which comprises mixing said material with a relatively small quantity of another mixture comprising basic, and also acid-yielding constituents and heating the charge containing co-mixture of both said mixtures until said impurities shall have been decomposed and eliminated therefrom.

9. The method of treating material composed preponderatingly of zirconia, but containing also undesired impurities which comprises mixing said material with a relatively small quantity of another mixture having basic, and also more of acid-yielding than basic, constituents and heating the charge containing co-mixture of both said mixtures until said impurities shall have been decomposed and eliminated therefrom.

10. The method of opaqueing glass including enamel which comprises co-heating a relatively fusible unvitrified glass or frit with a material composed preponderatingly of zirconia but also containing undesired impurities; cooling and comminuting the resulting sintered product, co-mixing said product with a greater quantity of a glass-yielding frit; and heating the co-mixture until said impurities are decomposed and eliminated therefrom and then cooling the charge to vitrification thereof.

11. The method of opaqueing glass including enamel which comprises co-melting a relatively small quantity of a relatively fusible glass-yielding frit with a greater quantity of a material composed preponderatingly of zirconia but also containing undesired impurities; cooling and comminuting the resulting sintered product; co-mixing a relatively small quantity of said product with a greater quantity of an unvitrified glass or frit other than that first mentioned; and heating the co-mixture until said impurities are decomposed and eliminated therefrom and then cooling the charge to vitrification thereof.

12. As a new article of manufacture an opacifier complex consisting preponderatingly of zirconia and a relatively small quantity of independently thereof glass-yielding materials.

13. As a new article of manufacture an unvitrified opacifier mixture composed preponderatingly of zirconia and comprising also a relatively small quantity of commingled basic and acid-forming ingredients.

14. As a new article of manufacture an opacifier complex composed preponderatingly of a sintered mixture of zirconia with a relatively small quantity of basic and acid-forming ingredients, the acid-forming being greater in quantity than the basic.

CHARLES J. KINZIE.